(12) United States Patent
Cocchi et al.

(10) Patent No.: US 10,736,338 B2
(45) Date of Patent: Aug. 11, 2020

(54) METHOD FOR MAKING ICE CREAM WITH A LOW SUGAR CONTENT COMPRISING PREBIOTICS PARTLY OR TOTALLY FERMENTED BY PROBIOTICS

(71) Applicant: ALI S.p.A.-CARPIGIANI GROUP, Milan (IT)

(72) Inventors: Andrea Cocchi, Calderara di Reno (IT); Roberto Lazzarini, Reggio Emilia (IT)

(73) Assignee: ALI GROUP S.r.l.—CARPIGIANI, Cernusco Sul Naviglio (IT)

( * ) Notice: Subject to any disclaimer, the term of this patent is extended or adjusted under 35 U.S.C. 154(b) by 0 days.

(21) Appl. No.: 14/452,717

(22) Filed: Aug. 6, 2014

(65) Prior Publication Data

US 2015/0044331 A1    Feb. 12, 2015

(30) Foreign Application Priority Data

Aug. 6, 2013    (IT) .............................. MI2013A1348

(51) Int. Cl.
*A23G 9/34*    (2006.01)
*A23G 9/36*    (2006.01)
*A23G 9/04*    (2006.01)
*A23G 9/46*    (2006.01)

(52) U.S. Cl.
CPC ................. *A23G 9/34* (2013.01); *A23G 9/04* (2013.01); *A23G 9/363* (2013.01); *A23G 9/46* (2013.01); *A23V 2002/00* (2013.01); *A23Y 2220/00* (2013.01); *A23Y 2240/00* (2013.01); *A23Y 2300/00* (2013.01)

(58) Field of Classification Search
CPC . A23G 9/34; A23G 9/04; A23G 9/363; A23G 9/46; A23V 2002/00; A23V 2220/00; A23V 2240/00; A23V 2300/00
USPC ................. 426/48, 524, 564, 565, 567, 580
See application file for complete search history.

(56) References Cited

U.S. PATENT DOCUMENTS

| | | | |
|---|---|---|---|
| 4,626,441 A * | 12/1986 | Wolkstein | A23C 9/13 426/548 |
| 2006/0286248 A1 | 12/2006 | Anfinsen et al. | |
| 2014/0227393 A1 * | 8/2014 | Chen | A23C 9/1275 426/43 |

FOREIGN PATENT DOCUMENTS

| | | |
|---|---|---|
| CN | 102429081 A | 5/2012 |
| EP | 1 882 418 A1 | 1/2008 |
| EP | 1 982 601 A1 | 10/2008 |
| EP | 2 070 424 A1 | 6/2009 |
| JP | 2008 508891 | 3/2008 |
| WO | WO 2006 015880 A1 | 2/2006 |
| WO | 2011/045130 A1 | 4/2011 |

OTHER PUBLICATIONS

Search Report for corresponding Italian Patent Application No. MI2013A 001348 dated Apr. 25, 2014.
H.W. Modler et al., "Using Ice Cream as a Mechanism to Incorporate Bifidobacteria and Fructooligosaccharides into the Human Diet", Cultured Dairy Products Journal, vol. 25, No. 3, pp. 4-6 and 8-9, Jan. 1, 1990.
M.B. Akin et al., "Effects of inulin and sugar levels on the viability of yogurt and probiotic bacteria and the physical and sensory characteristics in probiotic ice-cream", Food Chemistry, vol. 104, No. 1, pp. 93-99, Jan. 1, 2007.
M. Rossi et al., "Fermentation of Fructooligosaccharides and Inulin by Bifidobacteria: a Comparative Study of Pure and Fecal Cultures", Applied and Environmental Microbiology, vol. 71, No. 10, pp. 6150-6158, Oct. 1, 2005.
T. Di Criscio et al., "Production of functional probiotic, prebiotic and symbiotic ice creams", Journal of Dairy Science, vol. 93, No. 10, pp. 4555-4564, Oct. 1, 2010.
H.D. Goff et al., "Bifidobacteria, Fructooligosaccharides and Ice Cream", Canadian Dairy, Toronto, Canada, vol. 75, No. 3, p. 10, Jun. 1, 1996.
Notification of Reasons for Refusal for corresponding Japanese Patent Application No. 2014-157063 dated May 30, 2018.
Office Action for corresponding Chinese Patent Application No. 201410384139.0 dated Mar. 21, 2019 and its English translation.

* cited by examiner

*Primary Examiner* — Leslie A Wong
(74) *Attorney, Agent, or Firm* — Renner, Otto, Boiselle & Sklar, LLP

(57) ABSTRACT

The invention relates to a process for formulating an ice cream wherein a high percentage of the added sugars (from 0% to 20%) is substituted for complex sugar substances known as prebiotics which, after pasteurization, can be partly or totally fermented by probiotic bacteria of the genera *Bifidobacterium, Lactobacillus* and *Streptococcus*, or hydrolyzed by enzymes to obtain a partly fermented ice cream with a low sugar content and containing a high number (>10$^6$/ml) of live probiotic bacteria. The different prebiotics are used as individual ingredients or in mixtures and in diverse concentrations. The invention also relates to an ice cream comprising a reduced content of added sugars such as sucrose, dextrose, glucose syrup, partly or totally substituted for prebiotics, optionally fermented by probiotics and/or hydrolyzed by enzymes.

13 Claims, 1 Drawing Sheet

METHOD FOR MAKING ICE CREAM WITH A LOW SUGAR CONTENT COMPRISING PREBIOTICS PARTLY OR TOTALLY FERMENTED BY PROBIOTICS

This application claims priority to Italian Patent Application No. MI2013A001348 filed Aug. 6, 2013, which is hereby incorporated herein by reference in its entirety.

BACKGROUND OF THE INVENTION

This invention relates to an ice cream with a low sugar content containing prebiotics, optionally together with probiotics and/or enzymes, where the prebiotics are partly or totally fermented with probiotics or hydrolyzed with enzymes. The invention also relates to a process for making the ice cream.

The term probiotics is used to denote microbial food supplements which beneficially affect the health of the host by maintaining or improving its intestinal microbial balance. The term refers mainly to the genera *Lactobacillus* and *Bifidobacterium* but also, more rarely, to other genera, such as *Streptococcus* and *Saccharomyces*.

The term prebiotics, on the other hand, denotes sugar substances of varying complexity which are not used by the host and which therefore pass undigested to the large intestine (colon) where they are used selectively by some microbial groups and, in particular, by bifidobacteria and by lactobacilli. They are widely used in the food industry to make desserts, bread and bread products, breakfast cereals chocolate, etc.

To be classified as a prebiotic, an ingredient must not be hydrolyzed or absorbed in the small intestine and must act as a selective substrate and must thus promote the growth of at least one resident microbial group in the colon and play a positive role for the health of the host.

Prebiotics are generally non-digestible polysaccharides, of which the most widely used in the food industry are fructo-polysaccharides, fructose polymers. Of these, inulin is a natural polymer which may contain from 20 to several hundred fructose units and may have a degree of polymerization of 60 and even more. Fructo-oligosaccharides (FOS), on the other hand, are oligomers with a reduced number of fructose units and thus a degree of polymerization lower than or equal to 10. Oligofructose is a short-chain polymer made up of a few fructose units.

Other polysaccharide prebiotics are, for example, galacto-oligosacharides (GOS), trans-galacto-oligosaccharides, digestion-resistant maltodextrins, polydextrose, arabinogalactan, xylo-oligosaccharides and pyrodextrins. Non-saccharide prebiotics include soya proteins and isomalt.

Besides prebiotic ingredients, so-called functional foods may, as already mentioned, also contain probiotic ingredients consisting mainly of live bacteria of the genera *Bifidobacterium, Lactobacillus* and *Streptococcus*. The most important species used as probiotics in the food industry are *Bifidobacterium bifidum, B. breve, B. longum, B. adolescentis, B. infantis, B. catenulatum, B. pseudocatenuatum, B. lactis, Lactobacillus casei, L. rhamnosus, L. reuteri, L. acidophilus, L. fermentum, L. plantarum, L. delbrueckii* subsp, *bulgaricus, L. brevis,* and *Streptococcus thermophilus*.

The positive role played by probiotic bacteria in human health is due to specific properties such as the production of bacteriocins which limit the growth of pathogenic bacteria, a high immunomodulating and immunostimulating activity, the capacity to adhere to the intestinal epithelium, the production of organic acids such as lactic and acetic acid which lower the intestinal pH and combat the activities of pathogenic bacteria, antimutagenic and anticarcinogenic properties, the capacity to lower the cholesterol level and many more.

Milk and dairy products have always been the most widespread vehicle for prebiotic and/or probiotic ingredients beneficial to human health. The foods which contain these ingredients may be referred to as functional foods and, when they contain both prebiotics and probiotics, are termed symbiotic products.

Among dairy products, ice cream is an extremely widespread food and has a high nutritional value. The basic ingredients of ice cream are whole milk, skimmed milk, sugars and cream. The milk and cream provide the fats.

Ice creams may be considered O/W (Oil in Water) emulsions, that is to say, the fat is the disperse phase (which may be partly crystalline) and the water the continuous phase, both of the phases being stabilized by freezing.

Fundamental to the ice cream production process is the incorporation of air in the ice cream mixture.

The presence of air affects not only the organoleptic properties and palatability of the ice cream but also its thermal and physical properties. There are thus more than two phases, making ice cream a G/L (Gas/Liquid) foam, where the gas phase (air) is dispersed in the previously described emulsion.

The sugars affect the organoleptic properties of the ice cream but also the freezing point and viscosity of the mixtures. The fats affect the mechanical properties, the melting points and the palatability of the end product.

The food market is constantly on the lookout for new functional foods containing probiotic and prebiotic substances useful for the health of living organisms. Among dairy products, ice cream is an optimal vehicle for probiotic and prebiotic ingredients because it is widely consumed and is considered a nutritionally complete food.

SUMMARY OF THE INVENTION

In this market context, the Applicant has identified the possibility, by means of this invention, of meeting the need for new functional products with a low sugar content suitable as vehicles for prebiotic substances accompanied, if necessary, by probiotic substances or enzymes.

This invention thus relates to a functional ice cream wherein the added sugars are partly or totally substituted for one or more prebiotic substances which may be partly or totally fermented by probiotics or hydrolyzed by enzymes. The ice cream of the invention is thus characterized by a low sugar content, meaning by this a reduced quantity of added sugars.

The invention also relates to a process for making the ice cream of the invention and comprising a step of adding one or more prebiotic substances to the ice cream ingredients in partial or total substitution of the sugars and, optionally, a step of partially or totally fermenting the prebiotic substance (or substances) with probiotics or hydrolyzing them with enzymes.

The fermentation of the prebiotics may be performed after adding them to the ice cream ingredients or separately from the ice cream ingredients and then adding the mixture of fermented or enzyme-hydrolyzed prebiotics and probiotics to the other ice cream ingredients.

BRIEF DESCRIPTION OF THE DRAWINGS

The invention is described in detail below also with reference to the accompanying drawings, in which.

DESCRIPTION OF THE PREFERRED EMBODIMENTS

Figure 1:
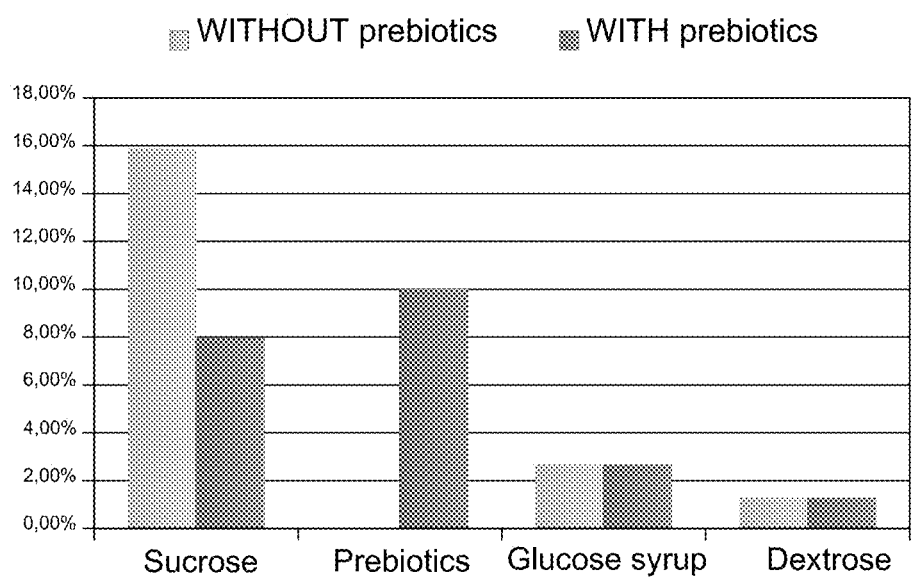
FIG. 1 shows the sugar composition of a plain ice cream mixture containing 10% of FOS.

In the context of the invention, the term "ice cream" is used to mean a milk or cream based food preparation to which fruit or other ingredients are added to obtain different flavors. For the purposes of the invention, the definition of ice cream also includes a food preparation based on water (instead of milk and cream) with the addition of fruit of diverse kinds to give it desired flavors. This preparation is commonly known as sorbet.

For the purposes of the invention, the term "added sugars" denotes monosaccharide or disaccharide sugars such as sucrose, dextrose and glucose syrup. In the description of the invention, these added sugars are also referred to as simple sugars.

The process for making the ice cream of the invention comprising one or more prebiotics, optionally together with probiotics or hydrolytic enzymes, comprises the following steps:

a) mixing a quantity of simple sugars (for example, sucrose, glucose syrup, dextrose) from 0% to 20% by weight with the ingredients required for preparing an ice cream mixture (for example, milk and cream, or water) with at least one prebiotic ingredient (or a mixture of prebiotic ingredients) in a variable quantity of from 1% to 20%;

b) optionally subjecting the mixture of step a) to pasteurization;

c) on completion of pasteurization, if performed, optionally adding at least one probiotic selected among the genera *Bifidobacterium, Lactobacillus* or *Streptococcus*, or at least one hydrolytic enzyme, and bringing the mixture to a temperature of between 20° C. and 40° C. for a time required for determining a multiplication of the probiotic or an activation of the enzyme and, consequently, a partial or total fermentation or hydrolysis of the prebiotic ingredient;

d) adding to the mixture of step c) the further ingredients required for obtaining the final flavor of the ice cream, for example, plain ice cream, fresh fruits, hard-shelled fruits, chocolate, etc.

On completion of step d), the mixture may be subjected to homogenization, maturation, aeration, mixing, freezing, stirring and hardening (step e). The ice cream thus obtained contains a high concentration of probiotic, if added, and a partial or total fermentation or hydrolysis of the prebiotic added as a substitute for the simple sugars.

Alternatively to the process described above, the prebiotic, preferably enriched with a percentage of yeast extract and a mixture of amino acids variable between 0.05% and 0.5% acting as a microbial growth factor, is not added to the mixture of step a) but is instead subjected to pasteurization separately from the mixture of step a), preferably in a thermostable pasteurizer, preferably for a length of time which may vary from 20 seconds to 5 minutes. Pasteurization occurs at high temperature, comprised between 85° C. and 110° C., also to at least partly eliminate the oxygen, which is usually toxic for the bifidobacteria, if added. After pasteurization, the probiotic or the enzyme, preferably in the form of a suspension or lyophilized powder, is added to the prebiotic and the mixture thus obtained is kept at a temperature comprised between 20° C. and 40° C., preferably 37° C., for a length of time necessary for the probiotic to multiply and the added prebiotic to ferment. If the probiotic used consists of bifidobacteria, oxygen-tolerant strains are mainly selected. Preferably, the quantity of probiotic bacteria used is comprised between $10^3$ and $10^6$ cells per ml of mixture.

The mixture thus fermented or hydrolyzed is then incorporated in the mixture of ingredients, optionally already pasteurized, according to step b).

The other ingredients needed to make the ice cream of the desired flavor are then added, as stated above (step d)).

The mixture is then subjected to homogenization, maturation, aeration, mixing, freezing, stirring and hardening (as stated in step e)), thereby obtaining the ice cream of the invention, containing prebiotics, optionally partly or totally fermented by probiotics or hydrolyzed by enzymes. In this embodiment, step c) is omitted because it is performed separately.

If the ice cream of the invention is water based (thus, substantially a sorbet), the step b) of initially pasteurizing the ingredients is omitted, whilst in the case of separate fermentation or hydrolysis of the prebiotic (by the probiotics or enzymes), the prebiotic is in any case subjected to pasteurization before fermentation.

In both the cases described, the total quantity of prebiotics added to the mixture of the ingredients during the preparation of the ice cream of the invention, is comprised between 1% and 20% by weight, preferably between 3% and 20% by weight, and more preferably, between 5% and 15% by weight, in both embodiments of the process.

The prebiotic ingredient is added in partial or total substitution of the simple sugars normally used in the standard ice cream preparation. These sugars, hereinafter referred to as added sugars, are preferably monosaccharide or disaccharide sugars. The added sugars may be, for example, one or more of the following: sucrose, glucose syrup and dextrose. Partial substitution of the added sugars, which in a typical, standard preparation of the ice cream are used in a quantity comprised between 14% and 25% by weight, allows making a functional ice cream containing ingredients beneficial to the human body such as prebiotics optionally fermented by probiotics or hydrolyzed by enzymes. The content of simple sugars added to the functional ice cream of the invention is comprised between a minimum value of around 0% up to a maximum of 20%, preferably between 3% and 20%, and more preferably between 4% and 10% by weight. The rest of the added sugars, up to the percentages present in the standard ice cream comprised between 14% and 25% by weight, is substituted for prebiotics.

In the context of this invention, the prebiotic ingredient is a non-digestible ingredient having a beneficial effect on the human body because it acts as a substrate for the growth of beneficial bacteria resident in the intestine. Preferably, but not necessarily, the prebiotic ingredient is of a complex polysaccharide nature. The prebiotic ingredient preferably used in the ice cream of the invention is selected among: galacto-oligosaccharides (GOS), trans-galacto-oligosaccharides, digestion-resistant maltodextrins (known by the trade name Fibersol), polydextrose, arabinogalactan, xylo-oligosaccharides, pyrodextrins, fructo-polysaccharides, among which preferably inulin, fructo-oligosaccharides (FOS), oligofructose and mixtures thereof. Non-saccharide prebiotics preferably used in the ice cream of the invention are soya proteins and isomalt.

More preferably, the prebiotic ingredient used in the ice cream of the invention is selected among: galacto-oligosaccharides (GOS), trans-galacto-oligosaccharides, digestion-resistant maltodextrins (known by the trade name Fibersol), polydextrose, arabinogalactan, xylo-oligosaccharides, pyrodextrins, soya proteins, isomalt and mixtures thereof. In a preferred embodiment, the prebiotic ingredient is selected among galacto-oligosaccharides (GOS), digestion-resistant maltodextrins, polydextrose, and mixtures thereof or among inulin and FOS or mixtures thereof. In other embodiments, the prebiotic ingredient is a mixture of inulin and, respectively, GOS, FOS, digestion-resistant maltodextrins, polydextrose; or a mixture of FOS and GOS; or a mixture of digestion-resistant maltodextrins and polydextrose; or a mixture of FOS and digestion-resistant maltodextrins.

The term "probiotic ingredient" is used to denote at least one bacterium of the genus *Lactobacillus* or *Bifidobacterium*, preferably selected among *B. longum, B. breve, B. bifidum, B. catenulatum, B. lactis, B. adolescentis, B. infantis* and *B. pseudocatenulatum*, and *Lactobacillus casei, L. rhamnosus, L. acidophilus, L. reuteri, L. fermentum, L. plantarum, L. delbrueckii* subsp, *bulgaricus, L. brevis* and mixtures thereof and/or a strain of the *Streptococcus thermophilus* species. The choice of the strain or strains of *Bifidobacterium* is based, if necessary on the capacity of some to tolerate the presence of small quantities of oxygen.

Preferably, the quantity of probiotic bacteria used is comprised between $10^3$ and $10^6$ cells per ml of mixture.

In a preferred embodiment of the process of the invention a prebiotic ingredient is used which is selected among: galacto-oligosaccharides (GOS), trans-galacto-oligosaccharides, digestion-resistant maltodextrins (known by the trade name Fibersol), polydextrose, arabinogalactan, xylo-oligosaccharides, pyrodextrins, soya proteins, isomalt and mixtures thereof and probiotics of the genus *Lactobacillus* or *Bifidobacterium* or mixtures thereof.

If enzymes are used instead of or in addition to the probiotic bacteria, the enzymes are of the glycosyl-hydrolase type, preferably selected among: alpha-galactosidase, beta-galactosidase and fructofuranosidase.

The prebiotic ingredient is partly or totally hydrolyzed, producing short-chain intermediates or simple sugars, by effect of the fermenting activity of the probiotic during the fermentation step or the hydrolytic activity of the enzyme, which may occur in the two ways described above.

As regards the other ingredients of the mixture of step a), the milk is preferably whole milk and/or powdered skimmed milk. The whole milk is used in a quantity comprised between 50% and 70% by weight. The powdered skimmed milk is used in a quantity comprised between 2% and 6% by weight.

The fresh cream is added in a quantity comprised between 8% and 15% by weight.

If a water based ice cream (definable as sorbet) is being prepared, the water is used in a quantity comprised between 20% and 30% by weight.

The pasteurization step b) may comprise a high-pasteurization cycle carried out at temperatures comprised between 80° C. and 110° C., preferably at around 85° C., for a time comprised between 20 and 40 seconds, or a low pasteurization cycle at temperatures comprised between 60° C. and 70° C., preferably at around 65° C., for a time comprised between 15 and 40 minutes. In one embodiment, pasteurization both of these cycles of treatment.

Pasteurization occurs preferably by heating with electrical resistors or by a reduced, hot gas cycle.

Pasteurization is necessary to destroy the bacterial charge that may be present in the raw ingredients of the ice cream. Thus, the pasteurization of step b) is omitted if the ice cream base is water and not milk and cream.

The same pasteurization methods apply even in the case described above where the prebiotic is subjected to pasteurization separately from the other ingredients, preferably in a thermostable pasteurizer.

After the probiotic has been incorporated in the mixture, the fermentation temperature is preferably around 37° C. The fermentation time is preferably comprised between 0.5 and 48 hours, and more preferably, between 0.5 and 24 hours, and is the time needed for the bacteria to multiply sufficiently for the prebiotic to ferment. If enzymes are used, the hydrolysis time may vary from 0.5 to 24 hours and the temperature is between 20° C. and 40° C. The fermentation of the prebiotic entails its possible partial or total hydrolysis, producing short-chain intermediates or simple sugars. More specifically, if the prebiotic ingredient is a polysaccharide, that is to say, it is selected among those described above, fermentation by means of the probiotic results in the formation of short-chain oligosaccharides or to the production of simple sugars or mixtures of short-chain oligosaccharides and simple sugars. The short-chain oligosaccharides and the simple sugars obtained by the partial or total hydrolysis of the prebiotics are therefore produced inside the functional ice cream of the invention together with the probiotics and partly or totally substitute the added sugars.

If the fermentation or hydrolysis of the prebiotic is performed separately from the rest of the ice cream ingredients, the probiotic or the enzyme necessary for fermentation or hydrolysis is added to the prebiotic after the pasteurization step, if performed, as described above. The probiotic or the enzyme is added in the form of a suspension in lyophilized form. Preferably, the prebiotic is enriched with yeast extract and a mixture of amino acids variable between 0.05% and 0.5% by weight to promote microbial growth. The treatment temperatures and times are the same as those described above for fermentation.

On completion of fermentation, which must be obtained in the partial or total absence of oxygen if the probiotic consists of bifidobacteria, the mixture obtained, comprising the probiotics and partly or totally hydrolyzed prebiotics, is added to the mixture of other ingredients after the pasteurization step b), if performed. In this case, step c) is omitted since it is performed separately as described above.

The other ingredients needed to make the ice cream of the desired flavor are then added: for example fresh cream for plain ice cream, fresh fruits, hard-shelled fruits, chocolate, etc. (step d)).

The subsequent steps of processing the mixture of ingredients, as per step e), namely homogenization, maturation, aeration, mixing, freezing, stirring and hardening, are performed according to the customary procedures known in the ice cream production trade. These steps, therefore, are not described further.

The production process just described allows obtaining a functional ice cream comprising at least one prebiotic ingredient, optionally partly or totally hydrolyzed by probiotics or enzymes, where at least one prebiotic ingredient partly or totally substitutes the simple added sugars normally used for the production of ice cream, in particular, sucrose, dextrose and/or glucose syrup.

The ice cream of the invention comprises a quantity of added sugars, preferably selected among sucrose, dextrose and/or glucose syrup, of between 0 and 20% by weight, preferably between 3% and 20%, and more preferably, between 4% and 10% by weight, this quantity of added sugars being obtained by total or partial substitution of the same for at least one prebiotic ingredient, where the prebiotic ingredient is optionally partly or totally fermented by a probiotic or hydrolyzed by an enzyme. The quantity of prebiotic is preferably comprised between 3% and 20% by weight, more preferably between 5% and 15% by weight.

The ice cream of the invention is obtained by partial or total substitution of the quantity of added sugars normally used for making ice cream, typically comprised between 14% and 25% by weight, for a corresponding quantity variable from 1% to 20% of a prebiotic ingredient and containing also a probiotic. Preferably, the added sugars are substituted for a mixture of prebiotic ingredients. More preferably, the prebiotic ingredient is partly or totally fermented by the probiotic or hydrolyzed by the enzyme, that is to say, it is partly or totally hydrolyzed. The prebiotic ingredient is preferably a non-digestible polysaccharide which may be hydrolyzed by the probiotic or by the enzyme to produce short-chain polysaccharides and/or simple sugars, as well as end products of lactic fermentation such as lactic acid and acetic acid.

All the proposed ice cream formulations were sensorially tested by a panel of experts based on properties such as structure, palatability, color, aroma, taste and sweetness, and the overall acceptability of the products was considered good or excellent.

EXAMPLES

Example 1

Composition of Plain Ice Cream Containing 10% of Different Prebiotics

| Ingredients | Mixture Standard % | Mixture Inulin 10% % | Mixture Fos 10% % | Mixture Gos 10% % | Mixture Fibersol 10% % | Mixture Fibersol 10% % |
|---|---|---|---|---|---|---|
| Whole milk | 66.67 | 66.67 | 66.67 | 66.67 | 66.67 | 66.67 |
| Skimmed milk powder | 3.47 | 3.47 | 3.47 | 3.47 | 3.47 | 3.47 |
| Fresh cream | 10.67 | 10.67 | 10.67 | 10.67 | 10.67 | 10.67 |
| Sucrose | 14.00 | 4.00 | 4.00 | 4.00 | 4.00 | 4.00 |
| Prebiotic | 0.00 | 10.00 | 10.00 | 10.00 | 10.00 | 10.00 |
| Glucose syrup | 3.33 | 3.33 | 3.33 | 3.33 | 3.33 | 3.33 |
| Dextrose | 1.60 | 1.60 | 1.60 | 1.60 | 1.60 | 1.60 |
| E410/E412 | 0.26 | 0.26 | 0.26 | 0.26 | 0.26 | 0.26 |
| Total | 100 | 100 | 100 | 100 | 100 | 100 |

The mixture is pasteurized at 85° C. for 30 seconds and cooled to 6° C.

It is allowed to mature at 4° C. for at least 3 hours.

Fresh cream and sucrose are added to obtain, respectively, 15.9% sucrose and 24.34% fresh cream out of the total weight of the end result of the recipe.

The ice cream thus made is then mixed and frozen and stored in a refrigerator at −18° C.

Example 2

Composition of Plain Ice Cream Containing 10% of Different Prebiotic Mixtures, Each in a Proportion of 5%

| Ingredients | Mixture Standard % | Mixture Inulin 5% Gos 5% % | Mixture Inulin 5% Fos 5% % | Mixture Inulin 5% Fibersol 5% % | Mixture Inulin 5% Polydextrose 5% % | Mixture Fos 5% Gos 5% % |
|---|---|---|---|---|---|---|
| Whole milk | 66.67 | 66.67 | 66.67 | 66.67 | 66.67 | 66.67 |
| Skimmed milk powder | 3.47 | 3.47 | 3.47 | 3.47 | 3.47 | 3.47 |
| Fresh cream | 10.67 | 10.67 | 10.67 | 10.67 | 10.67 | 10.67 |
| Sucrose | 14.00 | 4.00 | 4.00 | 4.00 | 4.00 | 4.00 |
| Prebiotic | 0.00 | 5.00 | 5.00 | 5.00 | 5.00 | 5.00 |
|  |  | 5.00 | 5.00 | 5.00 | 5.00 | 5.00 |
| Glucose syrup | 3.33 | 3.33 | 3.33 | 3.33 | 3.33 | 3.33 |
| Dextrose | 1.60 | 1.60 | 1.60 | 1.60 | 1.60 | 1.60 |
| E410/E412 | 0.26 | 0.26 | 0.26 | 0.26 | 0.26 | 0.26 |
| Total | 100 | 100 | 100 | 100 | 100 | 100 |

The mixture is pasteurized at 85° C. for 30 seconds and cooled to 6° C.

It is allowed to mature at 4° C. for at least 3 hours.

Fresh cream and sucrose are added to obtain the plain ice cream.

The ice cream thus made is then mixed and frozen and stored in a refrigerator at −18° C.

Example 3

Composition of Plain Ice Cream Containing 12% of Different Prebiotic Mixtures, Each in a Proportion of 6%

| Ingredients | Mixture Standard % | Mixture Inulin 6% Gos 6% % | Mixture Inulin 6% Fos 6% % | Mixture Inulin 6% Fibersol 6% % | Mixture Inulin 6% Polydextrose 6% % | Mixture Fos 6% Gos 6% % |
|---|---|---|---|---|---|---|
| Whole milk | 66.67 | 66.67 | 66.67 | 66.67 | 66.67 | 66.67 |
| Skimmed milk powder | 3.47 | 3.47 | 3.47 | 3.47 | 3.47 | 3.47 |
| Fresh cream | 10.67 | 10.67 | 10.67 | 10.67 | 10.67 | 10.67 |
| Sucrose | 14.00 | 2.00 | 2.00 | 2.00 | 2.00 | 2.00 |
| Prebiotic | 0.00 | 6.00 | 6.00 | 6.00 | 6.00 | 6.00 |
|  |  | 6.00 | 6.00 | 6.00 | 6.00 | 6.00 |
| Glucose syrup | 3.33 | 3.33 | 3.33 | 3.33 | 3.33 | 3.33 |
| Dextrose | 1.60 | 1.60 | 1.60 | 1.60 | 1.60 | 1.60 |
| E410/E412 | 0.26 | 0.26 | 0.26 | 0.26 | 0.26 | 0.26 |
| Total | 100 | 100 | 100 | 100 | 100 | 100 |

The mixture is pasteurized at 85° C. for 30 seconds and cooled to 6° C.

It is allowed to mature at 4° C. for at least 3 hours.

Fresh cream and sucrose are added to obtain the plain ice cream.

The ice cream thus made is then mixed and frozen and stored in a refrigerator at −18° C.

Example 4

Composition of Chocolate Ice Cream Containing 10% of Different Prebiotic Mixtures, Each in a Proportion of 5%

| Ingredients | Chocolate Standard % | Chocolate Inulin 5% Fos 5% % | Chocolate Inulin 5% Polydextrose 5% % | Chocolate Inulin 5% Fibersol 5% % | Chocolate Fibersol 5% Polydextrose 5% % | Chocolate Fos 5% Fibersol 5% % |
|---|---|---|---|---|---|---|
| Whole milk | 62.50 | 62.50 | 62.50 | 62.50 | 62.50 | 62.50 |
| Fresh cream | 6.88 | 6.88 | 6.88 | 6.88 | 6.88 | 6.88 |
| Sucrose | 15.63 | 5.63 | 5.63 | 5.63 | 5.63 | 5.63 |
| Prebiotic | 0.00 | 5.00 | 5.00 | 5.00 | 5.00 | 5.00 |
|  |  | 5.00 | 5.00 | 5.00 | 5.00 | 5.00 |
| Dextrose | 2.94 | 2.94 | 2.94 | 2.94 | 2.94 | 2.94 |
| E410/E412 | 0.18 | 0.18 | 0.18 | 0.18 | 0.18 | 0.18 |
| Cocoa 22/24 | 5.62 | 5.62 | 5.62 | 5.62 | 5.62 | 5.62 |
| Dark chocolate | 6.25 | 6.25 | 6.25 | 6.25 | 6.25 | 6.25 |
| Total | 100 | 100 | 100 | 100 | 100 | 100 |

Each mixture is pasteurized at 85° C. for 30 seconds and cooled to 6° C.

It is allowed to mature at 4° C. for at least 3 hours.

The ice cream thus made is then mixed and frozen and stored in a refrigerator at −18° C.

Example 5

Composition of Custard Ice Cream Containing Different Concentrations of Prebiotics

| Ingredients | Custard Standard % | Custard Inulin 7% Polydextrose 3% % | Custard Inulin 7% Fos 3% % | Custard Inulin 5% Polydextrose 5% % | Custard Inulin 5% Fos 5% % | Custard Fos 5% Polydextrose 5% % |
|---|---|---|---|---|---|---|
| Whole milk | 62.50 | 62.50 | 62.50 | 62.50 | 62.50 | 62.50 |
| Skimmed milk powder | 1.21 | 1.21 | 1.21 | 1.21 | 1.21 | 1.21 |
| Fresh cream | 7.28 | 7.28 | 7.28 | 7.28 | 7.28 | 7.28 |
| Egg yolk | 8.19 | 8.19 | 8.19 | 8.19 | 8.19 | 8.19 |
| Sucrose | 17.00 | 7.00 | 7.00 | 7.00 | 7.00 | 7.00 |
| Prebiotic | 0.00 | 7.00 | 7.00 | 5.00 | 5.00 | 5.00 |
|  |  | 3.00 | 3.00 | 5.00 | 5.00 | 5.00 |
| Dextrose | 1.82 | 1.82 | 1.82 | 1.82 | 1.82 | 1.82 |
| Glucose syrup | 1.82 | 1.82 | 1.82 | 1.82 | 1.82 | 1.82 |
| E410/E412 | 0.18 | 0.18 | 0.18 | 0.18 | 0.18 | 0.18 |
| Total | 100 | 100 | 100 | 100 | 100 | 100 |

Each mixture is pasteurized at 85° C. for 30 seconds and cooled to 6° C.

It is allowed to mature at 4° C. for at least 3 hours.

The ice cream thus made is then mixed and frozen and stored in a refrigerator at −18° C.

Example 6

Composition of Strawberry Sorbet Containing 10% of Different Prebiotics

| Ingredients | Mixture Standard % | Mixture Inulin 10% % | Mixture Fos 10% % | Mixture Polydextrose 10% % | Mixture Fibersol 10% % | Mixture Gos 10% % |
|---|---|---|---|---|---|---|
| Water | 23.60 | 23.60 | 23.60 | 23.60 | 23.60 | 23.60 |
| Strawberries | 50.00 | 50.00 | 50.00 | 50.00 | 50.00 | 50.00 |
| Sucrose | 23.90 | 13.90 | 13.90 | 13.90 | 13.90 | 13.90 |
| Prebiotic | 0.00 | 10.00 | 10.00 | 10.00 | 10.00 | 10.00 |
| Dextrose | 2.10 | 2.10 | 2.10 | 2.10 | 2.10 | 2.10 |
| Stabilizer | 0.40 | 0.40 | 0.40 | 0.40 | 0.40 | 0.40 |
| Total | 100 | 100 | 100 | 100 | 100 | 100 |

The sorbet is immediately mixed and frozen and then stored in a refrigerator at −18° C.

Figure 2:
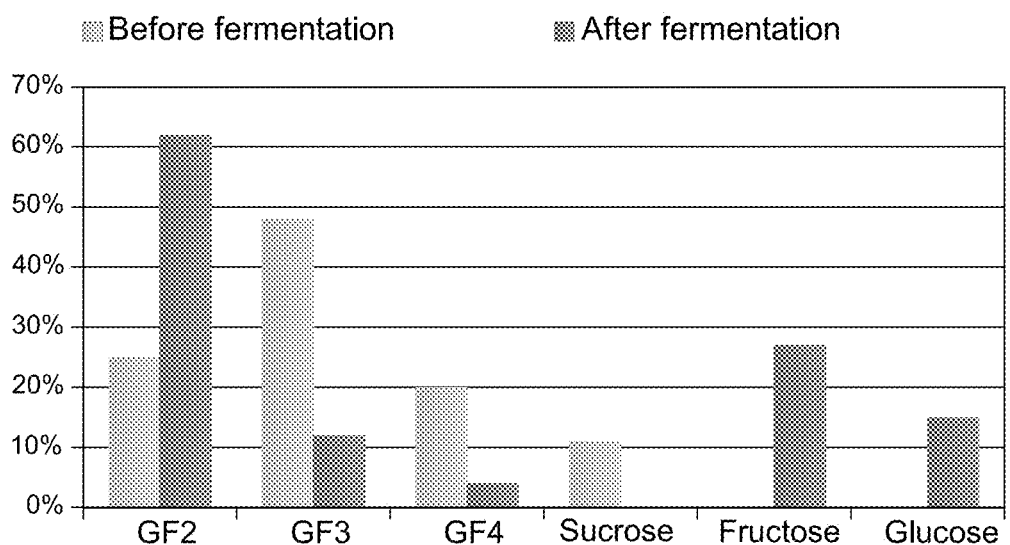
FIG. 2 shows the composition of simple sugars and complex sugars (FOS) in the mixture before and after fermentation with a strain of *Bifidobacterium*.

FIG. 1 shows the sugar composition of a plain ice cream mixture containing 10% of FOS in partial substitution of the simple sugars. FIG. 2 shows the composition of simple sugars and complex sugars (FOS) in the plain ice cream mixture before and after fermentation with a strain of *Bifidobacterium*.

It should be noted that defined according to the invention is an ice cream comprising from 0 to 20% by weight of added sugars, obtainable by partial or total substitution of the added sugars normally used for preparing ice cream, for at least one prebiotic ingredient or a mixture of prebiotic ingredients, partially or totally fermented by at least one probiotic ingredient or hydrolyzed by at least one enzyme.

Advantageously, and surprisingly, it was found that the addition of a prebiotic obtained by fermentation of a probiotic or hydrolyzation of an enzyme allows obtaining an ice cream of high quality in terms of organoleptic properties, and in particular, whose creaminess is particularly high.

Further, the ice cream thus made is highly digestible, making it particularly desirable for all categories of consumers.

Moreover, it was found experimentally that the prebiotic obtained by fermentation of a probiotic or hydrolyzation of an enzyme allows making an ice cream with a particularly high overrun.

These specific and well-defined advantages associated with the ice cream product have been found experimentally for the first time by the applicant. It is stressed that the temperatures, temperature gradients and times are critical aspects of the process for making the ice cream.

It should be noted that defined according to the invention is an ice cream comprising a prebiotic ingredient in total or partial substitution of the sugars.

FIG. 2 LEGEND

GF2=Kestose
GF3=Nystose
GF4=Fructofuranosyl-nystose

What is claimed is:

1. A process for reducing the content of added simple sugars in an ice cream by total or partial substitution of said simple sugars with at least one fermented prebiotic ingredient, said process comprising the steps of:
   a) mixing a quantity of from 0% to 20% by weight of at least one simple sugar selected from the group consisting of sucrose, glucose syrup, dextrose and mixtures thereof, with the ingredients for preparing an ice cream mixture and with at least one prebiotic ingredient selected from the group consisting of galacto-oligosaccharides (GOS), digestion-resistant maltodextrins, fructo-polysaccharides and mixtures thereof in a quantity from 3% to 20% by weight;
   b) subjecting the mixture of step a) to pasteurization;
   c) adding to the mixture of step b) at least one probiotic ingredient of the genus *Lactobacillus, Bifidobacterium*, or *Streptococcus* and bringing the mixture to a temperature of between about 37° C. to 40° C. for a time of 0.5 to 48 hours to partially or totally ferment the at least one prebiotic ingredient from the mixture of step b) by the at least one probiotic ingredient; and
   d) adding to the mixture of step c) the further ingredients required for obtaining the final flavor of the ice cream, thereby obtaining an ice cream comprising 0-20 wt. % of sucrose, dextrose and/or glucose syrup and the at least one fermented prebiotic ingredient.

2. The process according to claim 1 wherein, after step d), the mixture is subjected to homogenization, maturation, aeration, mixing and freezing, stirring and hardening.

3. The process according to claim 1, wherein the at least one probiotic is used, as an inoculum, in quantities comprised between 10^3 and 10^6 cells per ml of mixture.

4. The process according to claim 1, wherein the at least one prebiotic ingredient is a mixture of prebiotic ingredients.

5. The process according to claim 1, wherein the pasteurization step comprises a high-pasteurization cycle carried out for a time between 20 and 40 seconds.

6. The process according to claim 1, wherein the pasteurization step comprises a low-pasteurization cycle carried out for a time between 15 and 40 minutes.

7. The process according to claim 1, wherein the at least one prebiotic ingredient is added in quantities from 5% to 15% by weight.

8. The process according to claim 1, wherein the pasteurization comprises a high-pasteurization cycle carried out at temperatures comprised between 80° C. and 110° C., or a low pasteurization cycle at temperatures comprised between 60° C. and 70° C.

9. The process according to claim 8, wherein the pasteurization comprises both treatment cycles.

10. The process according to claim 1, wherein the at least one probiotic ingredient is selected among *B. longum, B. breve, B. bifidum, B. catenulatum, B. lactis, B. adolescentis, B. infantis, B. pseudocatenulatum, Lactobacillus casei, L. rhamnosus, L. acidophilus, L. reuteri, L. fermentum, L. plantarum, L. delbrueckii* subsp, *bulgaricus, L. brevis, Streptococcus thermophiles* and mixtures thereof.

11. The process according to claim 1, wherein the ice cream is a sorbet.

12. The process according to claim 1, wherein the ice cream further comprises kestose.

13. The process according to claim 1 wherein the process consists of the steps a), b), c), d), and after the step d), homogenization, maturation, aeration, mixing, freezing, stirring and hardening.

* * * * *